(12) United States Patent
Stuart et al.

(10) Patent No.: US 7,417,407 B1
(45) Date of Patent: Aug. 26, 2008

(54) CIRCUIT WITH A SWITCH FOR CHARGING A BATTERY IN A BATTERY CAPACITOR CIRCUIT

(75) Inventors: Thomas A. Stuart, Toledo, OH (US); Cyrus N. Ashtiani, West Bloomfield, MI (US)

(73) Assignee: The University of Toledo, Toledo, OH (US)

( * ) Notice: Subject to any disclaimer, the term of this patent is extended or adjusted under 35 U.S.C. 154(b) by 38 days.

(21) Appl. No.: 11/249,048

(22) Filed: Oct. 12, 2005

Related U.S. Application Data

(60) Provisional application No. 60/618,319, filed on Oct. 13, 2004.

(51) Int. Cl.
*H02J 7/00* (2006.01)
*H02J 7/04* (2006.01)
*H02J 7/16* (2006.01)

(52) U.S. Cl. .................. 320/166; 320/141; 320/103
(58) Field of Classification Search .................. 320/103, 320/141, 166
See application file for complete search history.

(56) References Cited

U.S. PATENT DOCUMENTS

| | | | | |
|---|---|---|---|---|
| 5,038,566 | A | * | 8/1991 | Hara .......................... 60/608 |
| 5,446,365 | A | * | 8/1995 | Nomura et al. ............. 320/128 |
| 5,666,041 | A | | 9/1997 | Stuart et al. |
| 5,990,661 | A | | 11/1999 | Ashtiani et al. |
| 6,072,301 | A | | 6/2000 | Ashtiani et al. |
| 6,078,165 | A | | 6/2000 | Ashtiani et al. |
| 6,166,549 | A | | 12/2000 | Ashtiani et al. |
| 6,230,496 | B1 | | 5/2001 | Hofmann et al. |
| 6,259,229 | B1 | | 7/2001 | Ashtiani et al. |
| 6,411,097 | B1 | | 6/2002 | Ashtiani et al. |
| 6,479,969 | B1 | | 11/2002 | Fazakas |
| 6,497,974 | B2 | | 12/2002 | Fuglevand |
| 6,651,759 | B1 | | 11/2003 | Gruenwald et al. |
| 6,683,389 | B2 | | 1/2004 | Geis |
| 6,806,686 | B1 | | 10/2004 | Thrap |
| 6,882,061 | B1 | | 4/2005 | Ashtiani et al. |
| 2005/0001635 | A1 | | 1/2005 | Ashtiani et al. |

OTHER PUBLICATIONS

U.S. Appl. No. 11/271,596, filed Nov. 10, 2005, Ashtiani et al.
US Dept of Energy, "FreedomCAR 42V Battery Test Manual", Apr. 2003.

* cited by examiner

*Primary Examiner*—Matthew V Nguyen
*Assistant Examiner*—Jue Zhang
(74) *Attorney, Agent, or Firm*—MacMillan Sobanski & Todd, LLC

(57) ABSTRACT

A circuit for charging a battery combined with a capacitor includes a power supply adapted to be connected to the capacitor, and the battery. The circuit includes an electronic switch connected to the power supply. The electronic switch is responsive to switch between a conducting state to allow current and a non-conducting state to prevent current flow. The circuit includes a control device connected to the switch and is operable to generate a control signal to continuously switch the electronic switch between the conducting and non-conducting states to charge the battery.

21 Claims, 3 Drawing Sheets

CIRCUIT WITH A SWITCH FOR CHARGING A BATTERY IN A BATTERY CAPACITOR CIRCUIT

This application claims priority to U.S. provisional application 60/618,319 filed Oct. 13, 2004, which is hereby incorporated by reference in its entirety.

STATEMENTS REGARDING FEDERALLY SPONSORED RESEARCH OR DEVELOPMENT AND RELATED APPLICATIONS

This invention was made with Government support under grant NAG3-2709 awarded by NASA. The Government has certain rights in this invention.

BACKGROUND OF THE INVENTION

This invention relates in general to circuits for charging batteries and in particular to a circuit with a switch and a control device for charging a battery, which is combined with a capacitor.

Referring now to the drawings, there is illustrated in FIG. 1 a known circuit 10 for charging a battery 12 combined with a capacitor 16. The battery 12 has a first battery terminal 13 and a second battery terminal 14. The capacitor has a first capacitor terminal 17 and a second capacitor terminal 18.

Preferably, the second battery terminal 14 is connected to ground, as indicated at 55.

The circuit 10 includes a blocking diode 52. The blocking diode 52 has a cathode 53 and an anode 54. The anode 54 is connected to the first battery terminal 13.

Also shown in FIG. 1 is a power supply 20, as indicated by dashed lines. The power supply 20 includes a motor-generator 24, and a power converter 28. The motor-generator 24 is an AC motor-generator. The motor-generator 24 has first and second motor-generator terminals 25 and 26.

The power converter 28 includes a rectifier, for converting the AC power from the motor-generator 24 to DC power. The power converter 28 has first and second input ports 29 and 30. The power converter 28 has first and second output ports 21 and 22. The first motor-generator terminal 25 is connected to the first input port 29. The second motor-generator terminal 26 is connected to the second input port 30. The motor-generator 24 is thus connected to the power converter 28.

The circuit 10 further includes a switch 32. The switch 32 has first a first switch terminal 33 connected to the first output port 21. The switch 32 has a second switch terminal 34 connected to the first battery terminal 13. The switch 32 also has a control terminal 35. The switch 32 is responsive to a control signal applied to the control terminal 35 to change between a conducting state that allows current flow between the first and second switch terminals 33 and 34 and a non-conducting state that prevents current flow between the first and second switch terminals 33 and 34. While the switch 32 is shown as an electrical device, it will be appreciated that the switch 32 may be a mechanical device or any other suitable switch.

Typically, a switch control line 48 connects the power converter 28 to the switch control terminal 35.

The power converter 28 is operable to generate a switch control signal to switch the switch 32 to the conducting state to charge the battery 12 when the power converter 28 is on and to switch the switch 32 to the non-conducting state when the power converter 28 is off. The switch control signal is transmitted to the switch 32 via the switch control line 48.

The first capacitor terminal 17 and the cathode 53 are connected to the first output port 21. The second capacitor terminal 18 and the second battery terminal 14 are connected to the second output port 22. The first battery terminal 13 being connected to the anode 54, the battery 12 and capacitor 16 are, thus, connected in parallel when either the diode 52 or the switch 32 is in the conducting state.

The capacitor 16 is suitable to provide energy for high current surges and the battery 12 is to provide energy during longer duration loads, as compared to the capacitor 16. When sufficient energy has been drained out of the capacitor 16, the voltage of the capacitor 16 will drop to the same voltage as the battery 12, and the diode 52 will change to a conducting state. When the diode 52 is in the conducting state, the battery 12 and the capacitor 16 will supply energy simultaneously. However, most of the energy is then supplied from the battery 12. When energy has been drained out of the battery 12, the battery 12 will to be recharged. The main purpose of the capacitor 16 is to shield the battery 12 from large current pulses, which for (+) $I_L$ is accomplished if and only if the voltage of the capacitor 16 is higher than the voltage of the battery 12. The capacitor 16 shields the battery 12 for all (−) $I_L$ as long as the switch 32 is open.

In operation, to charge the battery 12, the switch 32 is closed, or in a conducting state, and the power supply 20 provides power to the battery 12. Conversely, when the switch 32 is open, or in a non-conducting state, the power supply 20 does not supply power to the battery 12.

During charging, the voltage of the battery 12 and the voltage of the capacitor 16 are almost identical. Thus, a (+) IL pulse that may occur during charging may conduct through the diode 52 and the pulse will be shared between the capacitor 16 and the battery 12. Thus, during charging the capacitor 16 cannot shield the battery 12 from (+) IL current pulses, the main reason for combining the capacitor 16 with the battery 12. In practice, most of the (−) IL pulses will be much larger than the charging current, but the switch 32 will only be rated for the charging current. Therefore, during charging, the power supply 20 must detect the start of a (−) IL pulse and open the switch 32 in order to protect the switch 32. If the switch 32 is a mechanical device, it also will conduct (+) IL current and, therefore, also must be opened before the start of a (+) IL pulse.

BRIEF SUMMARY OF THE INVENTION

This invention relates generally to a circuit for charging a battery and more specifically to a circuit with a switch and a control device for charging a battery combined with a capacitor.

The present invention includes a circuit for charging a battery having a first battery terminal and a second battery terminal. The circuit includes a capacitor having a first capacitor terminal and a second capacitor terminal. The circuit includes a power supply having a first power supply terminal and a second power supply terminal. The first power supply terminal is adapted to be connected to the first capacitor terminal, and the second power supply terminal is adapted to be connected to both the second capacitor terminal and the second battery terminal. The circuit includes an electronic switch having a first switch terminal, a second switch terminal, and a control terminal. The first switch terminal is connected to the first power supply terminal. The electronic switch is responsive to a control signal applied to the control terminal to switch between a conducting state to allow current flow between the first and second switch terminals and a non-conducting state to prevent current flow between the first and second switch terminals. The circuit includes an inductor having first and second inductor terminals. The first inductor terminal is connected to the second switch terminal. The second inductor terminal is adapted to be connected to the first battery terminal. The circuit includes a diode having a cathode and an anode. The cathode is connected to the first power supply terminal and the anode is connected to the second inductor terminal. The circuit includes a control device connected to the switch control terminal. The control device is operable to generate a control signal to continuously switch the electronic switch between the conducting and non-conducting states to charge the battery.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
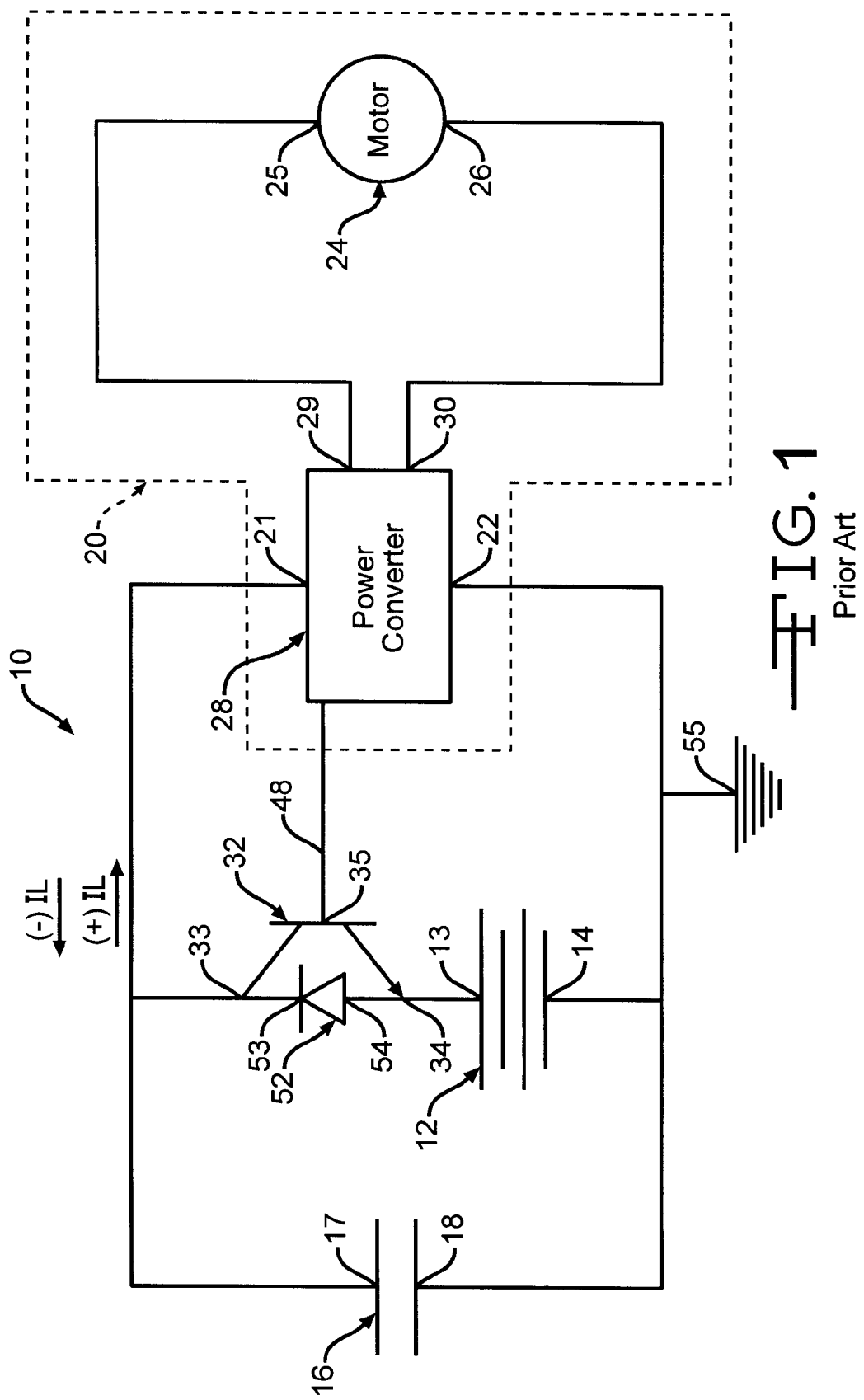
FIG. 1 is schematic view of a known circuit for charging a battery.
Figure 2:
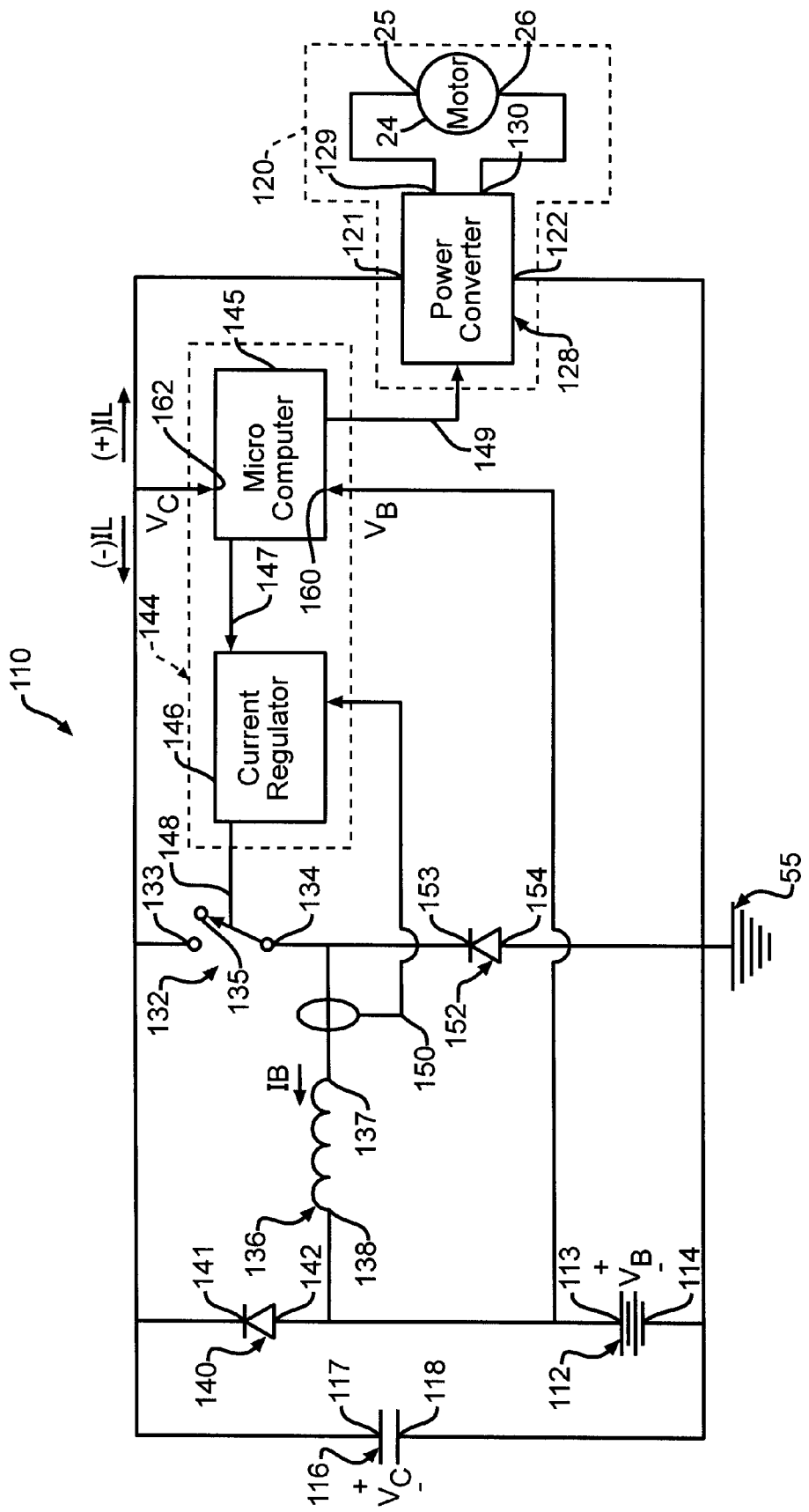
FIG. 2 is a schematic view of a first embodiment of a circuit for charging a battery combined with a capacitor in accordance with the present invention.

Referring again to the drawings, there is illustrated in FIG. 2 a circuit 110 for charging a battery 112 combined with a capacitor 116 in accordance with a preferred embodiment of the present invention, and similar components, as to FIG. 1, are labeled with the same numbers. The battery 112 has a first battery terminal 113 and a second battery terminal 114 and the capacitor 116 has a first capacitor terminal 117 and a second capacitor terminal 118.

The circuit 110 includes a free-wheeling diode 152. The free-wheeling 152 has a cathode 153 and an anode 154. The anode 154 is connected to ground, as indicated at 55.

Also shown in FIG. 2 is a power supply 120, as indicated by dashed lines. The power supply 120 includes the motor-generator 24 and a power converter 128. As discussed above the motor-generator 24 is an AC or DC motor-generator and has the first and second motor-generator terminals 25 and 26. In the case of an AC motor-generator, the power converter 128 includes a rectifier for converting the AC power from the motor-generator 24 to DC power. The power converter 128 has first and second input ports 129 and 130. The power converter 128 has first and second output ports 121 and 122. However, it must be understood that the power supply 120 may be any suitable power supply.

The first motor-generator terminal 25 is connected to the first input port 129 and the second motor-generator terminal 26 is connected to the second input port 130. The motor-generator thus supplies power to the power converter 128.

The first output port 121 is adapted to be connected to the first capacitor terminal 117. The second output port 122 is adapted to be connected to the second capacitor terminal 118, the second battery terminal 114, and the anode 154.

Preferably, the power converter 128 is also connected to a control device 144, as will be described below.

An electronic switch 132 has a first switch terminal 133 connected to the first output port 121. The electronic switch 132 has a second switch terminal 134. The second switch terminal 134 is connected to the cathode 153. The electronic switch 132 also has a control terminal 135 and the electronic switch 132 is responsive to a control signal applied to the control terminal 135 to change between a conducting state that allows current flow between the first and second switch terminals 133 and 134 and a non-conducting state that prevents current flow between the first and second switch terminals 133 and 134.

It must be understood that the electronic switch 132 may be any suitable switch, such as a bipolar transistor, a field-effect transistor, insulated gate bipolar transistor, or any other suitable switch.

The circuit 110 also includes an inductor 136 having first and second inductor terminals 137 and 138. The first inductor terminal 137 is connected to the second switch terminal 134. The second inductor terminal 138 is adapted to be connected to the first battery terminal 113.

The circuit 110 includes a blocking diode 140 having a cathode 141 and an anode 142. The cathode 141 is connected to the first output port 121. The anode 142 is connected to the first battery terminal 113.

The control device 144, as indicated by dashed lines, preferably includes a microprocessor, i.e. microcomputer, 145, and a current regulator 146, the purpose of which will be described below. The control device 144 is operable to initiate a charging cycle, as will be described below. The microprocessor 145 and the current regulator 146 are connected by an interface line 147.

The microprocessor 145 in the control device 144 has a first input port 160 and a second input port 162. The purpose of the input ports 160 and 162 will be described below.

The control device 144 has a switch control line 148 and a power control line 149. The switch control line 148 is connected to the switch control terminal 135. The power control line 149 is connected to the power converter 128.

The control device 144 is operable to generate a switch control signal to continuously switch the electronic switch 132 between the conducting and non-conducting states to charge the battery 112. That is to say that the switch will alternate between the conducting state and the non-conducting state with a cycle, i.e. duty cycle, as will be described below. The switch control signal is transmitted to the switch 132 via the switch control line 148.

The switch control signal is preferably a pulse width modulated signal with a duty cycle that varies as the battery 112 is charged. However, it must be understood that the switch control signal may be any suitable control signal.

The control device 144 is preferably operable to generate a power control signal to direct the power converter 128 to produce a specific value, i.e. magnitude, of a current, indicated by (−) IL, when the battery 112 is to be charged. Preferably, the power converter 128 includes equipment, such as sensors and regulators and the like, to regulate the current IL. The power control signal is transmitted to the power converter 128 via the power control line 149.

Preferably, a current sensor 150 is connected to the current regulator 146 within the control device 144. The current sensor 150 is a conventional device, such as a Hall effect linear sensor. However, it must be understood that any suitable current sensor may be used. The current sensor 150 is operable to measure the magnitude of a current, indicated by an arrow IB, flowing through the inductor 136. The current sensor 150 is operable to generate a sensor signal that is proportional to the magnitude of the inductor current IB and supply the signal to the control device 144. The control device 144 is responsive to the magnitude of the signal of the current sensor 150 to vary the control signal duty cycle to regulate the magnitude of the inductor current IB. Most preferably the current sensor 150 supplies the magnitude of the inductor current IB directly to the current regulator 146 and the current regulator 146 provides the control signal directly to the electronic switch 132. Thus, most preferably the current regulator 146 is a pulse width modulated signal generator that supplies a control signal to the switch control terminal 135 that has a duty cycle that is directly proportional to the inductor current IB.

Preferably, the first battery terminal 113 is connected to the first port 160 of the control device 144 to supply a battery voltage, as indicated by VB, to the control device 144. The control device 144 is responsive to the battery voltage VB to initiate a battery charging cycle.

To initiate a charging cycle the microprocessor 145 will generate the power control signal to switch the power converter 128 to the on state, and transmit the power control signal to the power converter 128 via the power control line 149. The power converter 128 will supply power to the electronic switch 132 for charging the battery 112. The microprocessor 145 will also generate a regulator control signal to switch the current regulator 146 to an active state, thus making the current regulator 146 responsive to the current sensor 150. The regulator control signal is transmitted to the current regulator 146 via the interface line 147.

The microprocessor is thus responsive to the battery voltage VB to initiate a battery charging cycle by actuating the power converter 128 to supply power to the electronic switch 132 for charging the battery 112 when the battery voltage VB falls below a predetermined threshold voltage.

Preferably, the second input port 162 of the microprocessor 145 is connected to the first terminal 117 of the capacitor 116 for sensing the capacitor voltage, VC. The microprocessor 145 is responsive to the magnitude of the capacitor voltage VC. In a preferred embodiment, the microprocessor 145 uses VC to determine an optimal value of the current (−) IL for charging the battery 112. Thus, the microprocessor preferably calculates and produces the power control signal to be transmitted to the power converter 128 via the power control line 149.

Most preferably, the microprocessor 145 monitors circuit conditions, i.e., VB and VC, and, when necessary, activates the current regulator 146 which provides a variable duty cycle PWM control signal to the electronic switch 132 with the duty cycle preferably being a function of the inductor current IB. When the current regulator 146 is activated, the electronic switch 132 is being continuously switched between states. When the switch 132 is conducting, increasing current flows to the left as shown by IB and into the battery 112 to charge the same. When the current regulator 146 is not activated, the electronic switch 132 remains in a non-conducting state.

Preferably, the circuit 110 includes the free-wheeling diode 152. As previously discussed, the free-wheeling diode 152 has a free-wheeling diode cathode 153 and a free-wheeling diode anode 154. The free-wheeling diode cathode 153 is connected to the second switch terminal 134. The free-wheeling diode anode 154 is connected to ground, as indicated at 55. The purpose of the free wheeling diode 152 is to allow the current IB to continue to flow through the battery 112 and the free wheeling diode 152 during that portion of the duty cycle where the switch 132 is in the non-conducting state. This means the current IB will be continuous, which is preferred.

In operation, to charge the capacitor 116, the power converter 128 is switched on and provides power to the capacitor 116. To charge the battery 112, the switch 132 is continuously switched between conducting states and non-conducting states and power is supplied to the battery 112 by the power supply 120.

The battery 112 is generally shielded from most of the current pulses from the power supply 120 in the circuit 110, which may harm the battery 112. Additionally, the battery 112 may be optimized for energy storage, as compared to power capability and the battery 112 will have a longer lifetime. The battery also can be kept at a state of charge close to 100% since it does not have to be kept at a partial state of charge; e.g., 70% in order to accept a regeneration pulse, (−) IL. This almost 100% state of charge also increases battery lifetime.

When the battery 112 is to be charged, the capacitor 116 does not need to be discharged and thus can shield the battery 112 from surging caused by a demand put on the system, such as a current demand required for acceleration and or regeneration of the vehicle. Additionally, the power converter 128 need not assume the task of regulating the current for charging the battery 112, as the switch 132 will regulate the current for charging the battery 112 by varying the time between switching between the conducting and non-conducting states, thus protecting the battery 112.

Figure 3:
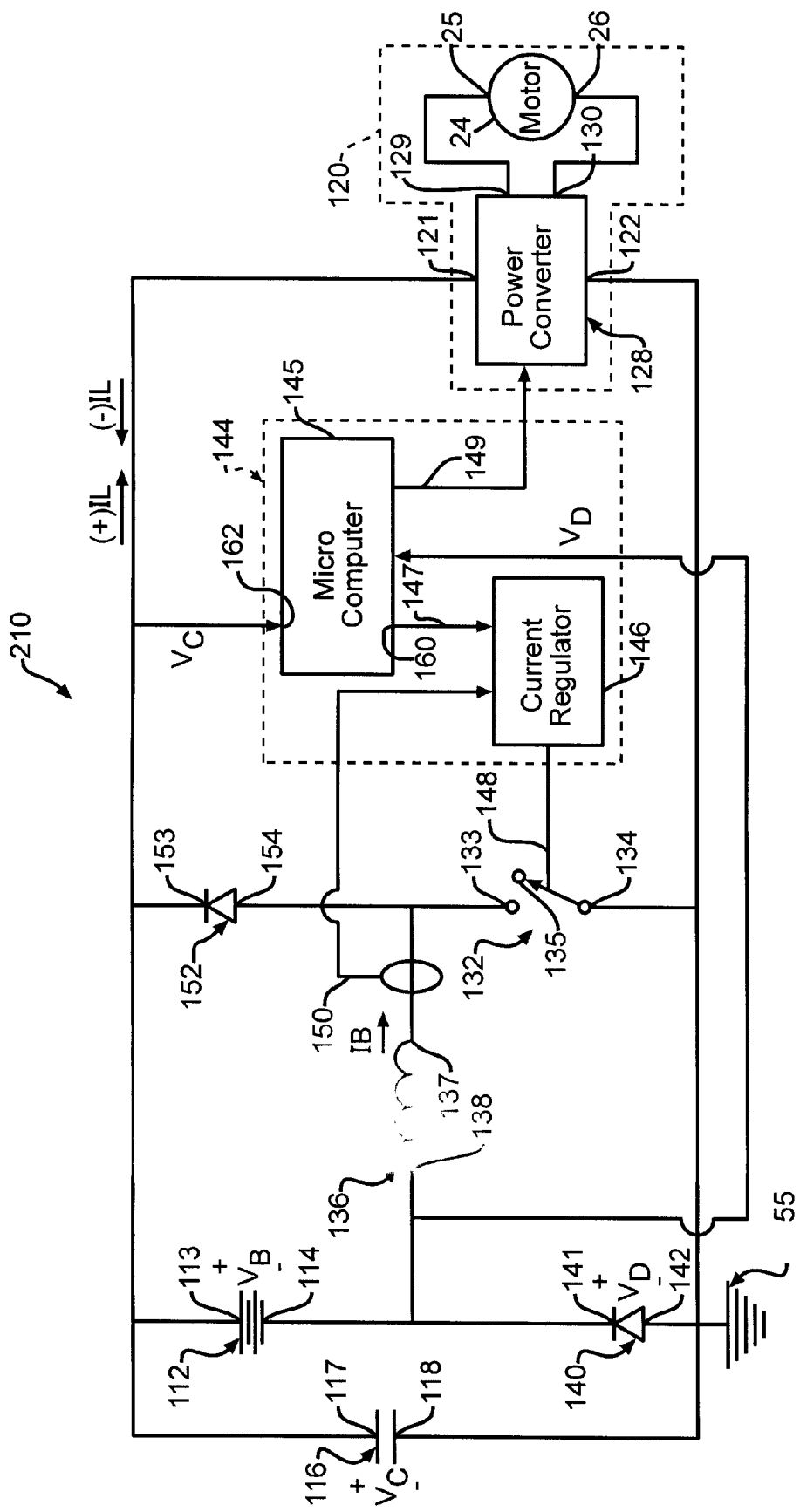
FIG. 3 is a schematic view of a second embodiment of a circuit for charging a battery combined with a capacitor in accordance with the present invention.

Referring to FIG. 3, there is illustrated a circuit 210 for charging the battery 112 combined with the capacitor 116 in accordance with an alternative embodiment the present invention, and similar components, as to FIGS. 1 and 2, are labeled with the same numbers.

The circuit 210 includes the free-wheeling diode 152. The cathode 153 is connected to the second battery terminal 114. The anode 154 is connected to the second capacitor terminal 118 and is connected to ground, as indicated at 55.

Also shown in FIG. 3 is the power supply 120, including the motor-generator 24 and the power converter 128. The power supply 120 is as discussed above. However, it must be understood that the power supply 120 may be any suitable power supply.

The first output port 121 is adapted to be connected to the first battery terminal 113 and is adapted to be connected to the first capacitor terminal 117. The second output port 122 is adapted to be connected to the second capacitor terminal 118 and is adapted to be connected to the anode 154.

The circuit 210 preferably includes the control device 144. The power converter 128 is connected to the control device 144, as described above.

The circuit 210 preferably includes the electronic switch 132. The second switch terminal 134 is connected to the second output port 122. The electronic switch 132 is preferably as described above. However, it must be understood that the electronic switch 132 may be any suitable switch.

The circuit 210 also includes the inductor 136. The first inductor terminal 137 is connected to the first switch terminal 133. The second inductor terminal 138 is adapted to be connected to the second battery terminal 114 and the cathode 141 of the blocking diode 140.

The circuit 210 includes the free wheeling diode 152. The cathode 153 is connected to the first output port 121, is connected to the first battery terminal 113, and is connected to the first capacitor terminal 117. The anode 154 is connected to the first switch terminal 133 and is connected to the first inductor terminal 137.

As described above, the control device 144, preferably includes the microprocessor 145, and the current regulator 146 connected by the interface line 147.

Preferably, the microprocessor 145 has the first input port 160 and the second input port 162, as described above.

The control device 144 has the switch control line 148 and the power control line 149. As described above, the switch control line 148 is connected to the switch control terminal 135 and the power control line 149 is connected to the power converter 128.

As described above, the control device 144 is operable to generate a switch control signal to continuously switch the electronic switch 132 between the conducting and non-conducting states to charge the battery 112. The switch control signal is transmitted to the switch 132 via the switch control line 148. However, it must be understood that the switch control signal may be any suitable control signal.

The control device 144 is preferably operable to generate a power control signal to direct the power converter 128 to produce a specific value, i.e. magnitude, of a current, indicated by (−) IL, when the battery is to be charged. Preferably, the power converter 128 includes equipment, such as sensors and regulators and the like, to regulate the current (−) IL. The power control signal is transmitted to the power converter 128 via the power control line 149.

As described above, preferably, the current sensor 150 is connected to the current regulator 146 within the control device 144. However, it must be understood that any suitable current sensor may be used. The current sensor 150 is operable to measure the magnitude of a current, indicated by an arrow IB, flowing through the inductor 136. The current sensor 150 is operable to generate a sensor signal that is to proportional the magnitude of the inductor current IB and supply the signal to the control device 144. The control device 144 is responsive to the magnitude of the signal of the current sensor 150 to vary the control signal duty cycle to regulate the magnitude of the inductor current IB. As described above, most preferably the current sensor 150 supplies the magnitude of the inductor current IB directly to the current regulator 146 and the current regulator 146 provides the control signal directly to the electronic switch 132.

Preferably, the blocking diode cathode 141 is connected to the first port 160 of the control device 144 to supply a diode voltage, as indicated by VD, to the control device 144. The control device 144 is responsive to the battery voltage VB (VC-VD) to initiate a battery charging cycle.

As described above, to initiate a charging cycle the microprocessor 145 will generate the power control signal to switch the power converter 128 to the on state, and transmit the power control signal to the power converter 128 via the power control line 149. The power converter 128 will supply power to the electronic switch 132 for charging the battery 112. The microprocessor 145 will also generate a regulator control signal to switch the current regulator 146 to an active state, thus making the current regulator 146 responsive to the current sensor 150. The regulator control signal is transmitted to the current regulator 146 via the interface line 147.

The microprocessor is thus responsive to the battery voltage VB to initiate a battery charging cycle by actuating the power converter 128 to supply power to the electronic switch 132 for charging the battery 112 when the battery voltage VB falls below a predetermined threshold voltage.

Preferably, as described above, the second input port 162 of the microprocessor 145 is connected to the first terminal 117 of the capacitor 116 for sensing the capacitor voltage, VC. The microprocessor 145 is responsive to the magnitude of the capacitor voltage VC. In a preferred embodiment, the microprocessor 145 uses VC to determine an optimal value of the current IL for charging the battery 112. Thus, the microprocessor preferably calculates and produces the power control signal to be transmitted to the power converter 128 via the power control line 149.

As discussed above, most preferably, the microprocessor 145 monitors circuit conditions, i.e., VB, VC and VD, and, when necessary, activates the current regulator 146 which provides a variable duty cycle PWM control signal to the electronic switch 132 with the duty cycle preferably being a function of the inductor current IB. When the current regulator 146 is activated, the electronic switch 132 is being continuously switched between states. When the switch 132 is conducting, current flows to the right as shown by IB and into the battery 112 to charge the same. When the current regulator 146 is not activated, the electronic switch 132 remains in a non-conducting state.

Preferably, the circuit 210 includes the free wheeling diode 152. As previously discussed, the free wheeling diode 152 has a free wheeling diode cathode 153 and a free wheeling diode anode 154. The free wheeling diode cathode 153 is connected to the second switch terminal 134. The free wheeling diode anode 154 is connected to the switch terminal 133.

In operation, as discussed above, to charge the capacitor 116, the power converter 128 is switched on and provides power to the capacitor 116. To charge the battery 112, the switch 132 is continuously switched between conducting states and non-conducting states and power is supplied to the battery 112 by the power supply 120.

The battery 112 is generally shielded from most of the current pulses from the power supply 120 in the circuit 210, which may harm the battery 112. Additionally, the battery 112 may be optimized for energy storage, as compared to power capability and the battery 112 will have a longer lifetime. The battery also can be kept at a state of charge close to 100% since it does not have to be kept at a partial state of charge; e.g., 70% in order to accept a regeneration pulse, (−) IL. This almost 100% state of charge also increases battery lifetime.

When the battery 112 is to be charged, the capacitor 116 does not need to be discharged and thus can shield the battery 112 from surging caused by a demand put on the system, such as a current demand required for acceleration of the vehicle. Additionally, the power converter 128 need not assume the task of regulating the current for charging the battery 112, as the switch 132 will regulate the current for charging the battery 112 by varying the time between switching between the conducting and non-conducting states, thus protecting the battery 112.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A circuit for charging a battery combined with a capacitor, the circuit comprising:
    a power supply adapted to be connected to the capacitor and the battery for charging the capacitor and the battery;
    an electronic switch having a first switch terminal connected to the power supply, a second switch terminal, and a control terminal, the electronic switch being responsive to a control signal applied to the control terminal to switch between a conducting state to allow current flow between the first and second switch terminals and a non-conducting state to prevent current flow between the first and second switch terminals, wherein current flow between the first and second switch terminals charges the battery;
    wherein the battery has first and second battery terminals, the capacitor has first and second capacitor terminals, and the power supply has first and second power supply terminals, and wherein the first power supply terminal is adapted to be connected to both the first capacitor terminal and the first switch terminal, and the second power supply terminal is adapted to be connected to both the second capacitor terminal and the second battery terminal;

an inductor having first and second inductor terminals, the first inductor terminal connected to the second switch terminal, the second inductor terminal adapted to be connected to the first battery terminal;

a control device connected to the switch control terminal, the control device operable to generate a control signal to continuously switch the electronic switch between the conducting and non-conducting states to charge the battery, and a blocking diode having a cathode and an anode, the cathode connected to the second switch terminal and the anode connected to the second inductor terminal, wherein the blocking diode is controlled by voltage levels of the capacitor and the battery without using a switching circuit;

wherein the circuit is configured such that
i) after the battery has supplied a surge current, the circuit rapidly recharges the battery to its fully charged state;
ii) the battery does not experience long periods of time in a partially charged state; and
iii) when the battery is to be charged, the capacitor does not need to be discharged, thus shielding the battery from surging caused by a demand put on the circuit.

2. The circuit according to claim 1 wherein the control signal is a pulse width modulated signal with a duty cycle that varies as the battery is charged.

3. The circuit according to claim 1 further including a current sensing device connected to the control device, the current sensing device operable to measure the magnitude of a current flowing through the inductor and to supply the inductor current magnitude to the control device, the control device being responsive to the inductor current magnitude to vary the control signal duty cycle in inverse proportion to the current magnitude.

4. The circuit according to claim 3 wherein the circuit includes a free-wheeling diode having a free-wheeling cathode and a free-wheeling anode, the free-wheeling diode cathode connected to the second switch terminal and the free-wheeling diode anode connected to the second power supply terminal.

5. The circuit according to claim 4 wherein the second inductor terminal is connected to the control device to supply a battery voltage to the control device, the control device being responsive to the battery voltage to initiate a battery charging cycle.

6. The circuit according to claim 5 wherein the power supply includes a motor-generator connected to an inverter with the inverter having a first terminal that is the first power supply terminal and a second terminal that is the second power supply terminal.

7. The circuit according to claim 6 wherein the inverter is connected to the control device, the control device being operable to actuate the inverter to supply power to the electronic switch for charging the battery;

wherein the control device is configured to
i) initiate a charging cycle;
ii) generate a switch control signal to continuously switch the electronic switch between conducting and non-conducting states to charge the battery; and
iii) respond to the battery voltage to initiate a battery charging cycle.

8. The circuit according to claim 7 wherein the control device includes a microprocessor.

9. The circuit according to claim 8 wherein the electronic switch is a field-effect transistor.

10. The circuit according to claim 8 wherein the electronic switch is a bipolar transistor.

11. The circuit according to claim 8 wherein the electronic switch is an insulated gate bipolar transistor.

12. A circuit for charging a battery combined with a capacitor, wherein the battery has first and second battery terminals and the capacitor has first and second capacitor terminals, the circuit comprising:

a power supply having a first power supply terminal and a second power supply terminal, the first power supply terminal adapted to be connected to the first capacitor terminal, the second power supply terminal adapted to be connected to both the second capacitor terminal and the second battery terminal;

an electronic switch having a first switch terminal connected to the first power supply terminal and a second switch terminal, the electronic switch further having a control terminal, the electronic switch being responsive to a control signal applied to the control terminal to switch between a conducting state to allow current flow between the first and second switch terminals and a non-conducting state to prevent current flow between the first and second switch terminals;

an inductor having first and second inductor terminals, the first inductor terminal connected to the second switch terminal, the second inductor terminal adapted to be connected to the first battery terminal;

at least one blocking diode having a cathode and an anode, the cathode connected to the first power supply terminal and the anode connected to the second inductor terminal; wherein the blocking diode is controlled by voltage levels of the capacitor and the battery without using a switching circuit, and a control device connected to the switch control terminal, the control device operable to generate a control signal to continuously switch the electronic switch between the conducting and non-conducting states to charge the battery;

wherein the circuit is configured such that
i) after the battery has supplied a surge current, the circuit rapidly recharges the battery to its fully charged state;
ii) the battery does not experience long periods of time in a partially charged state; and
iii) when the battery is to be charged, the capacitor does not need to be discharged, thus shielding the battery from surging caused by a demand put on the circuit.

13. The circuit according to claim 12 further including a current sensing device connected to the control device, the current sensing device operable to measure the magnitude of a current flowing through the inductor and to supply the inductor current magnitude to the control device, the control device being responsive to the inductor current magnitude to vary the control signal duty cycle in inverse proportion to the current magnitude.

14. The circuit according to claim 13 wherein the circuit includes a second free-wheeling diode having a free-wheeling cathode and a free-wheeling anode, the free-wheeling diode cathode connected to the second switch terminal and the free-wheeling diode anode connected to the second power supply terminal.

15. The circuit according to claim 14 wherein the second inductor terminal is connected to the control device to supply a battery voltage to the control device, the control device being responsive to the battery voltage to initiate a battery charging cycle.

16. The circuit according to claim 15 wherein the power supply includes a motor-generator connected to an inverter with the inverter having a first terminal that is the first power supply terminal and a second terminal that is the second power supply terminal.

17. The circuit according to claim 16 wherein the inverter is connected to the control device, the control device being operable to actuate the inverter to supply power to the electronic switch for charging the battery;

wherein the control device is configured to i) initiate a charging cycle;

ii) generate a switch control signal to continuously switch the electronic switch between conducting and non-conducting states to charge the battery; and iii) respond to the battery voltage to initiate a battery charging cycle.

18. The circuit according to claim 17 wherein the control device includes a microprocessor.

19. The circuit according to claim 18 wherein the electronic switch is a field-effect transistor.

20. The circuit according to claim 18 wherein the electronic switch is a bipolar transistor.

21. The circuit according to claim 18 wherein the electronic switch is an insulated gate bipolar transistor.

* * * * *

UNITED STATES PATENT AND TRADEMARK OFFICE
CERTIFICATE OF CORRECTION

PATENT NO. : 7,417,407 B1 Page 1 of 1
APPLICATION NO. : 11/249048
DATED : August 26, 2008
INVENTOR(S) : Thomas A. Stuart and Cyrus N. Ashtiani It is certified that error appears in the above-identified patent and that said Letters Patent is hereby corrected as shown below:

Column 10, Claim 14, Line 61, delete "second".

Signed and Sealed this

Twenty-first Day of October, 2008

JON W. DUDAS
*Director of the United States Patent and Trademark Office*